United States Patent
Ho et al.

(10) Patent No.: US 8,648,929 B2
(45) Date of Patent: Feb. 11, 2014

(54) ANTI-FLICKER CAMERA AND IMAGE CAPTURE METHOD THEREOF

(75) Inventors: Wen-Cheng Ho, Zhubei (TW); Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 142 days.

(21) Appl. No.: 13/444,290

(22) Filed: Apr. 11, 2012

(65) Prior Publication Data

US 2013/0113959 A1 May 9, 2013

(30) Foreign Application Priority Data

Nov. 9, 2011 (TW) .............................. 100140845 A

(51) Int. Cl.
- *H04N 9/73* (2006.01)
- *H04N 5/228* (2006.01)
- *H04N 5/235* (2006.01)
- *H04N 5/217* (2011.01)
- *H04N 5/238* (2006.01)

(52) U.S. Cl.
USPC .................. 348/226.1; 348/222.1; 348/228.1; 348/229.1; 348/241; 348/364

(58) Field of Classification Search
USPC ........ 348/207.99, 207.1, 222.1, 226.1–230.1, 348/241, 294–324, 362–368, 470, 348/607–624; 250/208.1, 214
See application file for complete search history.

(56) References Cited

U.S. PATENT DOCUMENTS

| | | | |
|---|---|---|---|
| 6,295,085 B1 * | 9/2001 | Munson et al. ............. | 348/226.1 |
| 6,519,002 B1 * | 2/2003 | Tomaszewski ............. | 348/226.1 |
| 6,630,953 B1 * | 10/2003 | Toyoda et al. ............. | 348/226.1 |
| 6,710,818 B1 * | 3/2004 | Kasahara et al. ............. | 348/607 |
| 6,900,834 B2 * | 5/2005 | Henderson et al. ......... | 348/226.1 |
| 7,471,316 B2 * | 12/2008 | Takahashi et al. ......... | 348/226.1 |
| 7,598,987 B2 * | 10/2009 | Desprez-Le Goarant et al. .......................... | 348/226.1 |
| 8,106,963 B2 * | 1/2012 | Tsukihara .................. | 348/226.1 |
| 8,279,303 B2 * | 10/2012 | Niikura ..................... | 348/226.1 |
| 8,339,473 B2 * | 12/2012 | Fukugawa et al. ......... | 348/226.1 |
| 8,456,540 B2 * | 6/2013 | Egawa ........................ | 348/226.1 |
| 8,462,229 B2 * | 6/2013 | Yost et al. .................. | 348/226.1 |
| 2002/0044205 A1 * | 4/2002 | Nagaoka et al. ............. | 348/229 |
| 2003/0112343 A1 * | 6/2003 | Katoh et al. ............... | 348/226.1 |
| 2003/0142239 A1 * | 7/2003 | Yoshida et al. ............. | 348/607 |
| 2004/0080630 A1 * | 4/2004 | Kim ........................... | 348/226.1 |
| 2004/0109069 A1 * | 6/2004 | Kaplinsky et al. ......... | 348/226.1 |
| 2004/0165084 A1 * | 8/2004 | Yamamoto et al. ........ | 348/226.1 |
| 2004/0179114 A1 * | 9/2004 | Silsby et al. ............... | 348/226.1 |
| 2005/0046704 A1 * | 3/2005 | Kinoshita .................. | 348/226.1 |
| 2005/0206745 A1 * | 9/2005 | Daiku et al. ............... | 348/226.1 |
| 2005/0238259 A1 * | 10/2005 | Kim et al. ..................... | 382/312 |
| 2006/0055823 A1 * | 3/2006 | Kinoshita et al. ............. | 348/511 |
| 2007/0052816 A1 * | 3/2007 | Nomura et al. ............ | 348/226.1 |

(Continued)

*Primary Examiner* — Michael Osinski
(74) *Attorney, Agent, or Firm* — McClure, Qualey & Rodack, LLP

(57) ABSTRACT

Anti-flicker camera and image capture method are disclosed. According to the disclosed method, exposure integrals of different lines of an image sensed by a camera device are calculated. The exposure integrals are compared with reference exposure integrals of the plurality of lines, respectively, to calculate exposure integral offsets for the lines. The reference exposure integrals are estimated from at least one reference image. The positive and negative changes of the exposure integral offsets are statistically analyzed and, accordingly, it is determined whether there is light flicker from background illumination and an auto-exposure control module of the camera device is controlled based on the determination.

10 Claims, 10 Drawing Sheets

(56) References Cited

U.S. PATENT DOCUMENTS

| | | |
|---|---|---|
| 2007/0126895 A1* | 6/2007 | Desprez-Le Goarant et al. ............................. 348/255 |
| 2007/0153094 A1* | 7/2007 | Noyes et al. ............... 348/226.1 |
| 2007/0263101 A1* | 11/2007 | Cho et al. ................... 348/226.1 |
| 2008/0278603 A1* | 11/2008 | Lee et al. ................... 348/226.1 |
| 2008/0284870 A1* | 11/2008 | Yokoi ........................ 348/228.1 |
| 2008/0303920 A1* | 12/2008 | Kinoshita .................. 348/226.1 |
| 2009/0033763 A1* | 2/2009 | Tsukihara .................. 348/226.1 |
| 2009/0122155 A1* | 5/2009 | Kishi et al. ................. 348/226.1 |
| 2009/0135276 A1* | 5/2009 | Urisaka .......................... 348/241 |
| 2009/0219409 A1* | 9/2009 | Mikami ..................... 348/226.1 |
| 2009/0303365 A1* | 12/2009 | Watanabe ..................... 348/302 |
| 2010/0013953 A1* | 1/2010 | Niikura ...................... 348/226.1 |
| 2010/0053369 A1* | 3/2010 | Nagai ........................ 348/226.1 |
| 2011/0149149 A1* | 6/2011 | Jiao et al. ...................... 348/447 |
| 2011/0187893 A1* | 8/2011 | He et al. .................... 348/226.1 |
| 2012/0154629 A1* | 6/2012 | Horiuchi ................... 348/226.1 |
| 2013/0271623 A1* | 10/2013 | Jo ............................. 348/226.1 |

* cited by examiner

ANTI-FLICKER CAMERA AND IMAGE CAPTURE METHOD THEREOF

CROSS REFERENCE TO RELATED APPLICATIONS

This Application claims priority of Taiwan Patent Application No. 100140845, filed on Nov. 9, 2011, the entirety of which is incorporated by reference herein.

BACKGROUND OF THE INVENTION

1. Field of the Invention

The present invention relates to anti-flicker cameras and image capture methods.

2. Description of the Related Art

The light intensity of indoor lighting generally oscillates with the oscillation of the AC voltage. For example, the light intensity may oscillate at 50 or 60 Hz.

Image capture devices generally capture images line by line (e.g. image capture techniques for a CCD or CMOS photosensitive array.) Thus, for different lines of an image, the background illumination may not be constant. Light and dark stripes may appear over the sensed image, which is called a light flicker problem.

BRIEF SUMMARY OF THE INVENTION

An anti-flicker camera and an image capture method are disclosed.

In accordance with an exemplary embodiment of the invention, an image capture method with an anti-flicker function comprises the steps as follows. According to the disclosed method, exposure integrals of different lines of an image sensed by a camera are calculated, and, for each line, the exposure integral is compared with a reference exposure integral corresponding thereto and thereby an exposure integral offset is obtained. The reference exposure integrals of different lines of the image are estimated from at least one reference image. The positive and negative changes in these exposure integral offsets of the different lines of the sensed image is statistically analyzed for determining whether there is light flicker from background illumination, and, according to the result of the determining step, an auto exposure control module of the camera is controlled.

An anti-flicker camera in accordance with an exemplary embodiment of the invention comprises an image sensor, an image signal processor, a flicker detector and an auto exposure control module. The image signal processor is coupled to the image sensor. Based on image data provide from the image signal processor, the flicker detector determines whether there is light flicker from background illumination in an image sensed by the image sensor. When the flicker determines that there is light flicker from background illumination, the auto exposure control module controls the image sensor or/and the image signal processor to compensate for the light flicker from background illumination.

In an exemplary embodiment, the flicker detector comprises a line exposure integral estimation module, a storage unit, an offset calculation module, and a statistical analysis and determination module for exposure integral offset. The line exposure integral estimation module estimates exposure integrals of different lines of the image sensed by the image sensor. The storage unit is stored with reference exposure integrals for the different lines, which are obtained from at least one reference image. The offset calculation module is coupled to the line exposure integral estimation module and is capable of accessing the storage units. The offset calculation module compares the exposure integrals of the different lines of the image sensed by the image sensor with the reference exposure integrals, and thereby exposure integral offsets of the different lines of the image sensed by the image sensor are obtained. The statistical analysis and determination module statistically analyzes positive and negative changes of the exposure integral offsets of the different lines of the at least one image sensed by the image sensor, and thereby determines whether there is light flicker from background illumination.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
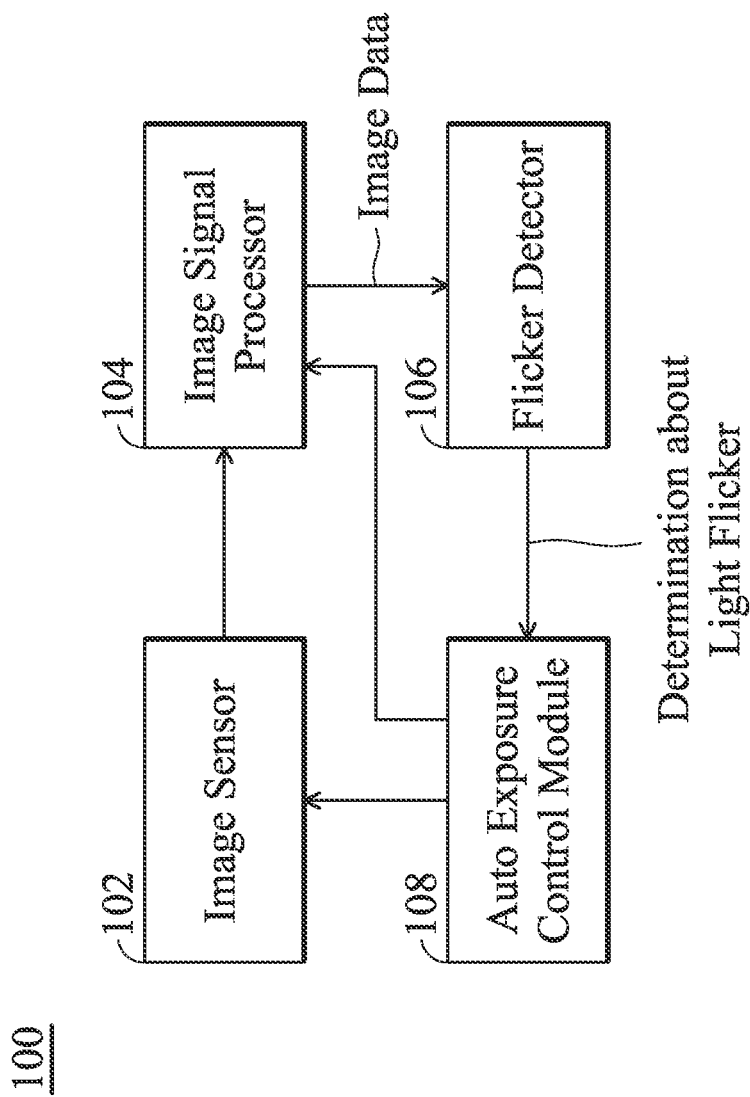
FIG. 1 is a block diagram depicting an anti-flicker camera 100 in accordance with an exemplary embodiment of the invention.

FIG. 1 is a block diagram depicting an anti-flicker camera 100 in accordance with an exemplary embodiment of the invention, which comprises an image sensor 102, an image signal processor 104, a flicker detector 106 and an auto exposure control module 108.

The image sensor 102 may comprise a CCD sensor array or a CMOS sensor array or any sensor which captures an image line by line wherein all pixels of one line are captured at the same time. The image signal processor 104 is coupled to the image sensor 102 to transform the data sensed by the image sensor 102 to image data. According to the image data provided by the image signal processor 104, the flicker detector 106 determines whether the image sensed by the image sensor 102 contains light flicker from background illumination. When the flicker detector 106 determines that there is light flicker from background illumination, the auto exposure module 108 controls the image sensor 102 or/and the image signal processor 104 to compensate for the light flicker from background illumination.

In an exemplary embodiment, the auto exposure control module 108 sets an exposure time according to the flicker detection result. The image sensor 102 acts according to the exposure time.

In another exemplary embodiment, the auto exposure control module 108 sets a gain value according to the flicker detection result. The image sensor 102 and the image signal processor 104 may both act according to the gain value.

In other exemplary embodiments, the flicker detection result may affect the auto exposure module 108 to set the exposure time and the gain value both.

Figure 2:
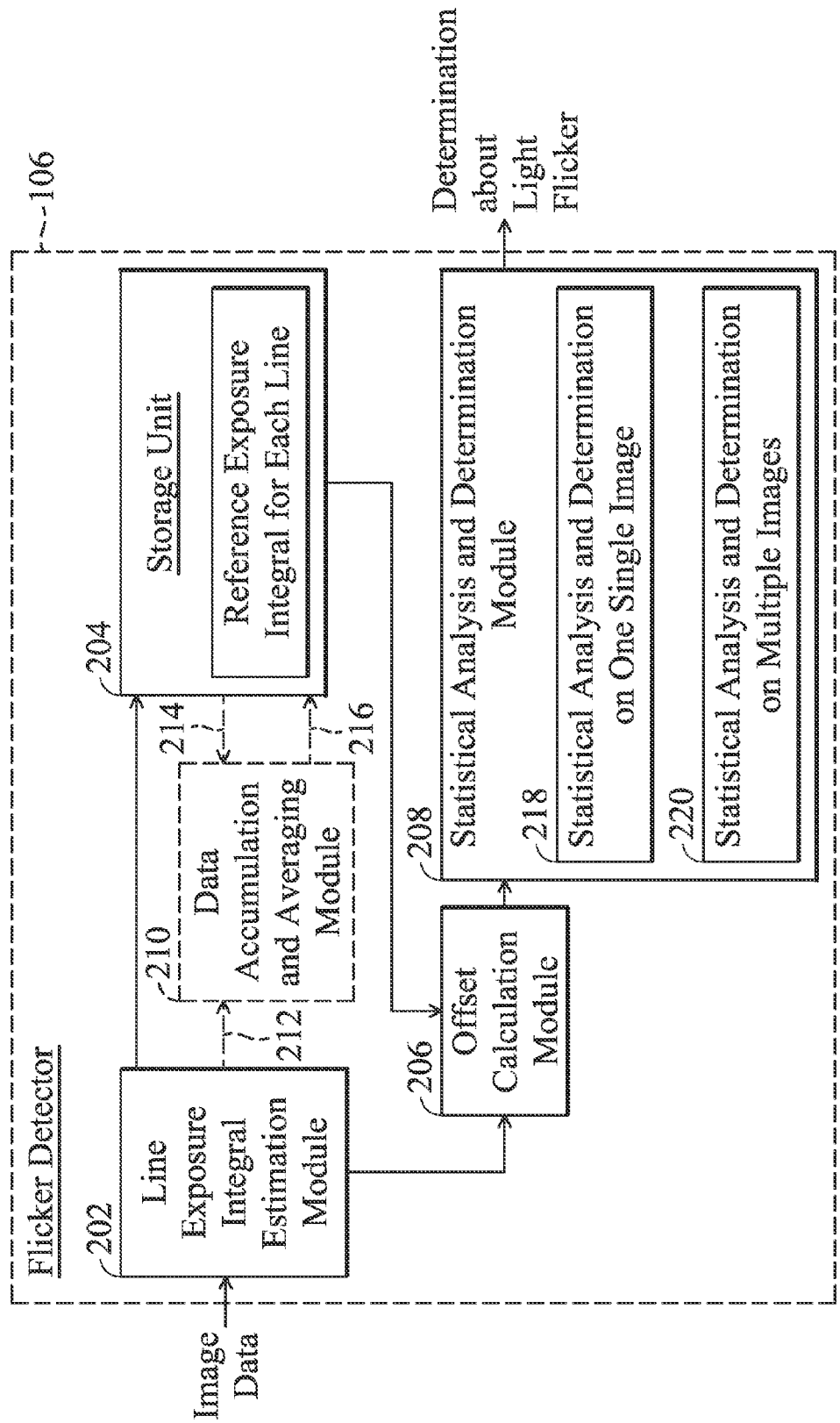
FIG. 2 is a block diagram depicting an exemplary embodiment of the flicker detector 106.

FIG. 2 is a block diagram depicting an exemplary embodiment of the flicker detector 106, which comprises a line exposure integral estimation module 202, a storage unit 204, an offset calculation module 206 and a statistical analysis and determination module 208 for exposure integral offset.

Figure 3:
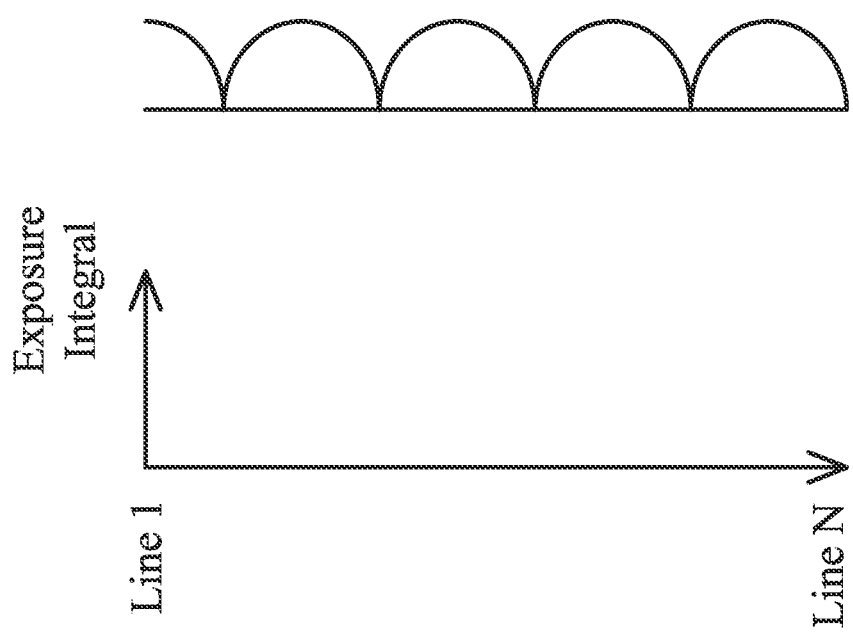
FIG. 3 depicts exposure integrals of different lines of an image.

Based on the image data from the image signal processor 104, the line exposure integral estimation module 202 estimates an exposure integral for each line of the image sensed by the image sensor 102. FIG. 3 depicts the exposure integrals of different lines of an image. From the top down, the vertical axis shows the first line to the Nth line. The horizontal axis shows the magnitude of exposure integrals of the different lines. The waveform of FIG. 3 shows that the light intensity periodically oscillates along the downward axis. The periodically oscillating light intensity may be due to the light flicker from background illumination, or, may be due to the features of the object which is captured (e.g. in a case wherein an image of a window shutter is captured.)

In the storage unit 204, reference exposure integrals for different lines for excluding the periodic features of the captured object are stored therein. The reference exposure integrals for the different lines may be estimated from one single reference image or from multiple reference images.

In an exemplary embodiment, estimation results from the line exposure integral estimation module 202 may be stored into the storage unit 204 as the reference exposure integrals for the different lines, which is referred to later when another image is captured.

In another exemplary embodiment, the flicker detector 106 further comprises a data accumulation and averaging module 210, by which the exposure integrals at the same line and obtained from multiple images are accumulated and averaged to form the reference exposure integral for the line. The exposure integral data 212 of the current image and the exposure integral data 214 obtained from accumulating and averaging the data of previous images are accumulated and averaged as the exposure integral data 216, which are stored into the storage unit 204 as the reference exposure integrals.

Figure 4:
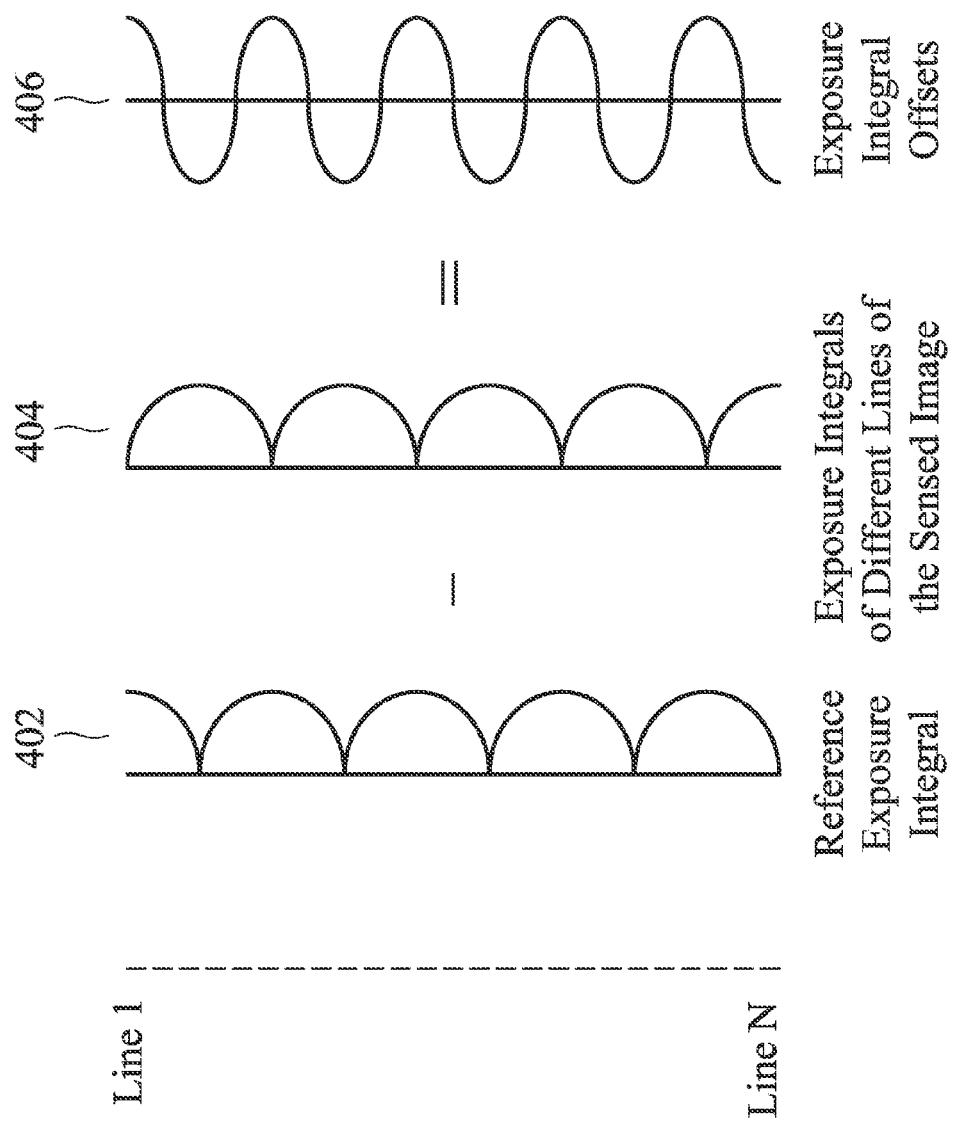
FIG. 4 shows the calculation performed by the offset calculation module 206.

In this paragraph, a way for excluding periodic features of the captured object is discussed. The offset calculation module 206 is coupled to the line exposure integral estimation module 202 and is capable of accessing the storage unit 204. By the offset calculation module 206, the exposure integrals of different lines of a current image (that the line exposure integral estimation module 202 obtains from the current image data) are compared with the reference exposure integrals of the different lines (accessed from the storage unit 204.) Accordingly, exposure integral offsets for different lines of the image sensed by the image sensor 102 are calculated. FIG. 4 shows the calculation performed by the offset calculation module 206. The waveform 402 shows the reference exposure integrals for different lines, which are stored in the storage unit 204. Data of the waveform 404 are provided from the line exposure integral estimation module 202, which are the exposure integrals of different lines of the sensed image. The waveform 406 is a comparison result (e.g. obtained by subtraction) between the waveform 402 and the waveform 404, which shows the exposure integral offsets of different lines of the sensed image. In the waveform 406, the periodic features of the object itself are removed from consideration, and only the light flicker from background illumination is shown.

In the exemplary embodiment of FIG. 4, the periodic oscillation of the waveform 406 shows that the sensed image contains light flicker from background illumination. Note that it is an important issue in this field to determine whether the waveform 406 is oscillating periodically. Fourier transformation (FFT) is commonly used in conventional techniques. By FFT hardware, it is determined whether the exposure integral offsets over the lines oscillate periodically. The FTT hardware, however, is expensive and inaccurate. Further, the FFT hardware is incapable of identifying periodic oscillation of low magnitude. In this disclosure, the statistical analysis and determination module 208 for exposure integral offset is designed to replace the conventional FFT hardware.

By the statistical analysis and determination module 208 for exposure integral offset, the positive and negative changes of the exposure integral offsets over the lines of the at least one image sensed by the image sensor 208 are statistically counted, and, based on the statistic result of the counting, it is determined whether light flicker from background illumination exists.

Referring back to FIG. 2, based on one specific information accessed from the storage unit 204 about the reference exposure integrals for different lines, the statistical analysis and determination module 208 may include a function 218 performing statistical analysis and determination on one single image and a function 220 performing statistical analysis and determination on multiple images, for obvious and unobvious periodic oscillation of the exposure integral offsets, respectively.

Figure 5:
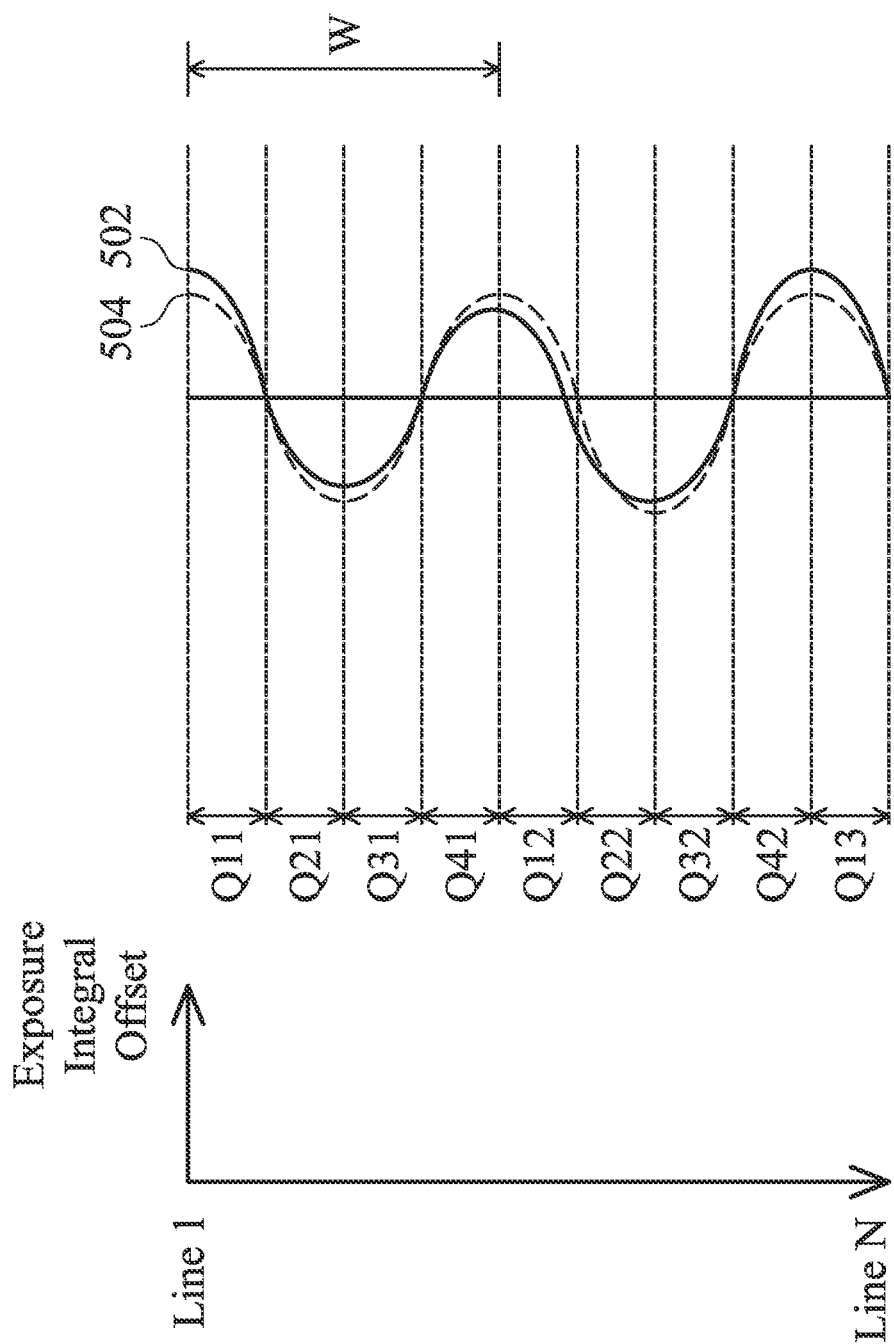
FIG. 5 defines observation intervals for statistical analysis and determination of the function block 218.
Figure 6A:
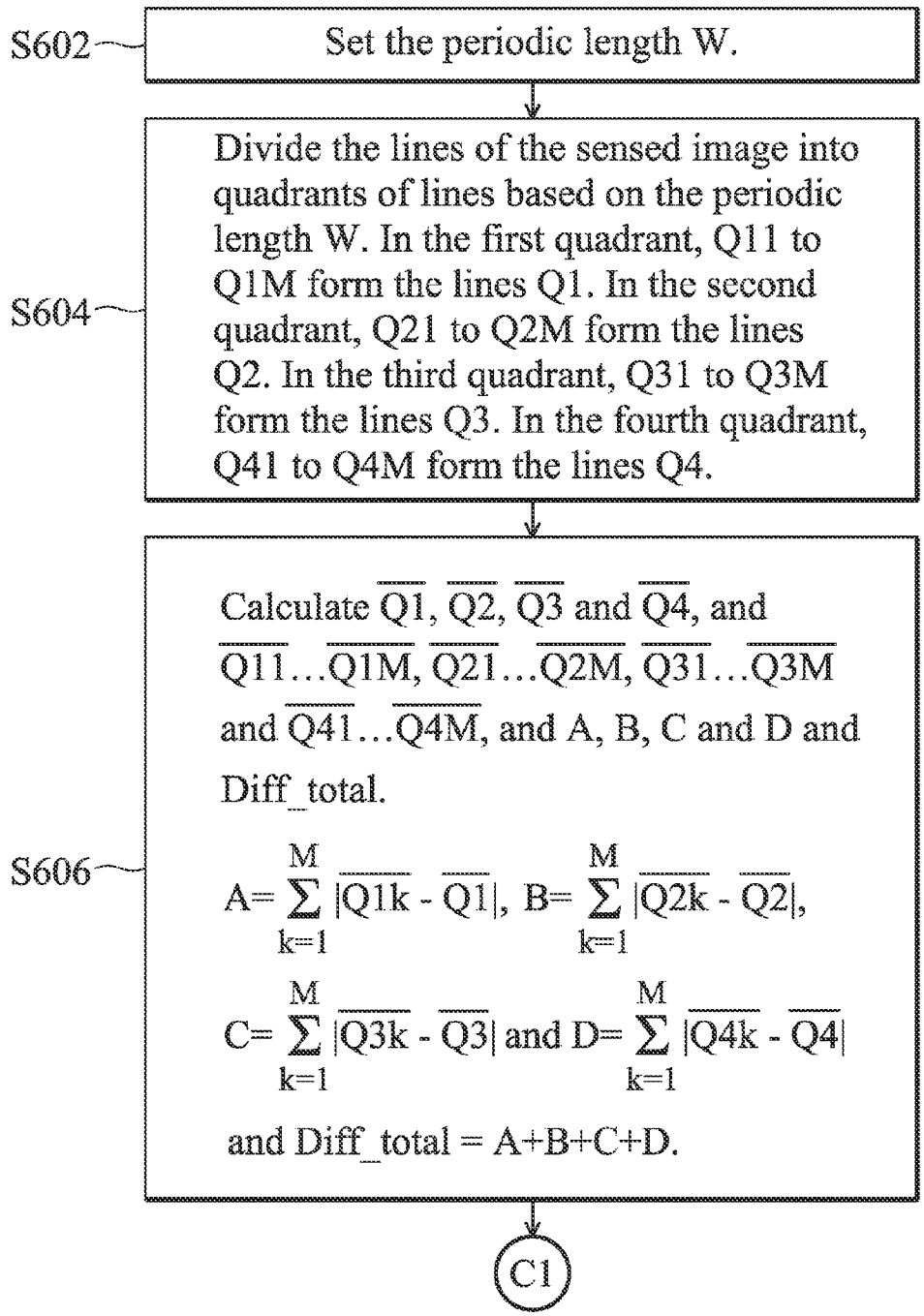
FIG. 6A and FIG. 6B show a flowchart depicting the statistical analysis and determination provided by the function block 218.
Figure 6B:
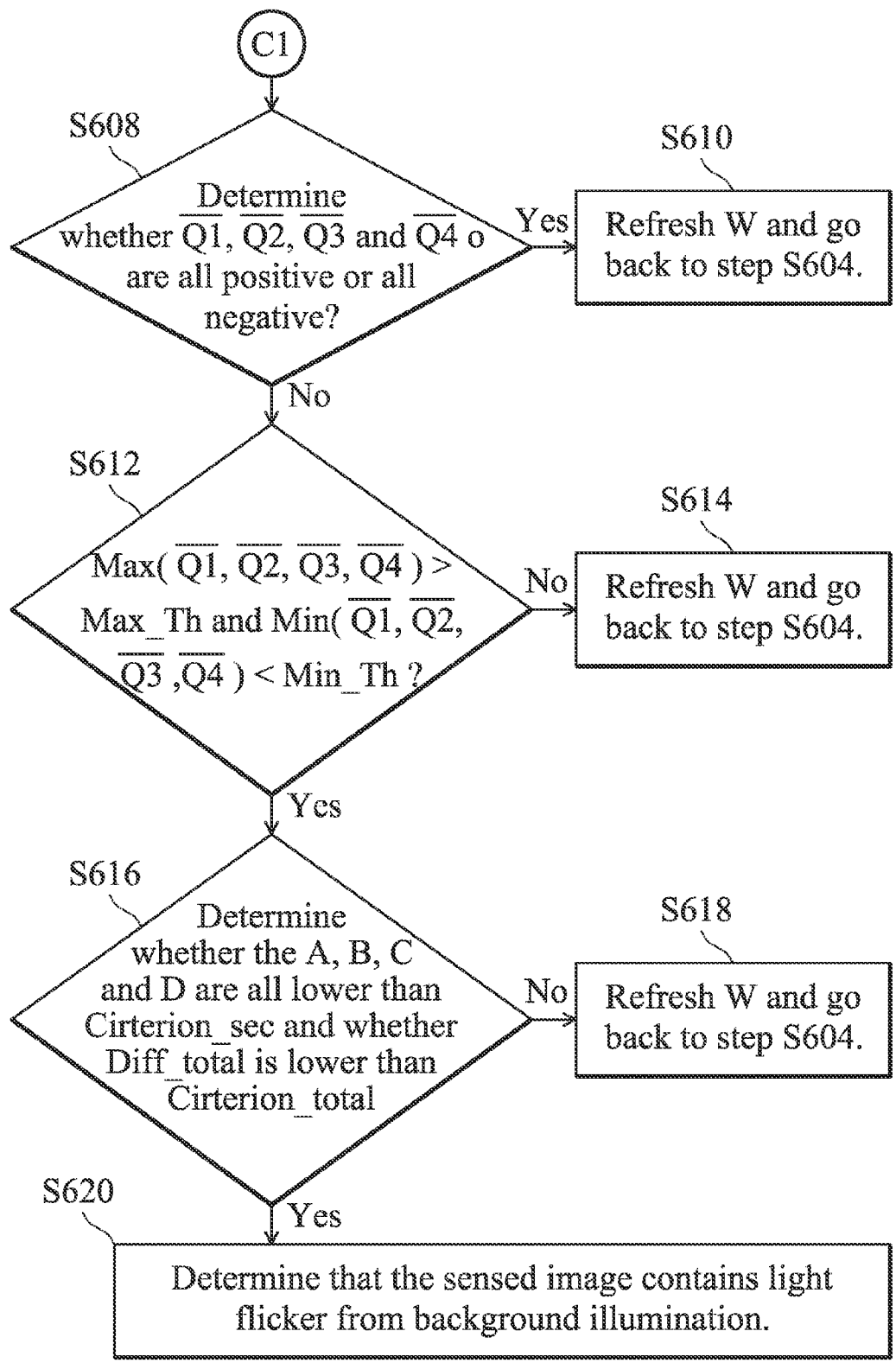

FIGS. 5, 6A and 6B illustrate the function 218, for statistical analysis and determination on one signal image, provided by the statistical analysis and determination module 208.

In FIG. 5, observation intervals for the statistical analysis and determination of function 218 are defined. The waveform 502 shows the exposure integral offsets of different lines. For a periodic length W (e.g., estimated from one possible oscillation of light flicker), the ideal sinusoidal wave of exposure integrals is shown by a waveform 504. According to the sinusoidal waveform 504, the lines of the image are divided into four groups: lines corresponding to a first quadrant (labeled by Q1); lines corresponding to a second quadrant (labeled by Q2); lines corresponding to a third quadrant (labeled by Q3); and lines corresponding to a fourth quadrant (labeled by Q4.) Referring to the lines Q1 corresponding to the first quadrant, sectors of continuous lines are shown, labeled Q11, Q12, Q13 and so on. Referring to the lines Q2 corresponding to the second quadrant, sectors of continuous lines are shown, labeled Q21, Q22 and so on. Referring to the lines Q3 corresponding to the third quadrant, sectors of continuous lines are shown, labeled Q31 and Q32 and so on. Referring to the lines Q4 corresponding to the fourth quadrant, sectors of continuous lines are shown, labeled Q41 and Q42 and so on.

FIGS. 6A and 6B show a flowchart depicting the statistical analysis and determination provided by the function 218.

In step S602, the periodic length W is set.

In step S604, based on the periodic length W, the lines of the sensed image are divided into groups: lines Q1 corresponding to a first quadrant; lines Q2 corresponding to a second quadrant; lines Q3 corresponding to a third quadrant; and lines Q4 corresponding to a fourth quadrant. As shown in FIG. 5: the lines Q1 corresponding to the first quadrant contain sectors of continuous lines, labeled Q11 . . . Q1M; the lines Q2 corresponding to the second quadrant contain sectors of continuous lines, labeled Q21 . . . Q2M; the lines Q3 corresponding to the third quadrant contain sectors of continuous lines, labeled Q31 . . . Q3M; and the lines Q4 corresponding to the fourth quadrant contain sectors of continuous lines, labeled Q41 . . . Q44.

In step S606, an average exposure integral offset $\overline{Q1}$ for the first quadrant, an average exposure integral offset $\overline{Q2}$ for the second quadrant, an average exposure integral offset $\overline{Q3}$ for the third quadrant and an average exposure integral offset Q4 for the fourth quadrant are calculated. The average exposure integral offset Q1 for the first quadrant is an average value of the exposure integral offsets of all lines corresponding to the first quadrant Q1. The average exposure integral offset $\overline{Q2}$ for the second quadrant is an average value of the exposure integral offsets of all lines corresponding to the second quadrant Q2. The average exposure integral offset $\overline{Q3}$ for the third quadrant is an average value of the exposure integral offsets of all lines corresponding to the third quadrant Q3. The average exposure integral offset $\overline{Q4}$ for the fourth quadrant is an average value of the exposure integral offsets of all lines corresponding to the fourth quadrant Q4. Note that in the step S606 the following calculations are performed as well. For the sectors of continues lines Q11 . . . Q1M in the lines Q1 corresponding to the first quadrant, average values of exposure integral offset are calculated separately to obtain partition averages $\overline{Q11}$ . . . $\overline{Q1M}$ for the first quadrant. For the sectors of continues lines Q21 . . . Q2M in the lines Q2 corresponding to the second quadrant, average values of exposure integral offset are calculated separately to obtain partition averages $\overline{Q21}$ . . . $\overline{Q2M}$ for the second quadrant. For the sectors of continues lines Q31 . . . Q3M in the lines Q3 corresponding to the third quadrant, average values of exposure integral offset are calculated separately to obtain partition averages $\overline{Q31}$ . . . $\overline{Q3M}$ for the third quadrant. For the sectors of continues lines Q41 . . . Q4M in the lines Q4 corresponding to the fourth quadrant, average values of exposure integral offset are calculated separately to obtain partition averages $\overline{Q41}$ . . . $\overline{Q4M}$ for the fourth quadrant. Further, in step S606, an evaluation value A for the first quadrant, an evaluation value B for the second quadrant, an evaluation value C for the third quadrant and an evaluation value D for the fourth quadrant and an overall evaluation value Diff_total are calculated. The evaluation value A for the first quadrant is calculated by summing up the absolute differences between the partition averages $\overline{Q11}$ . . . $\overline{Q1M}$ and the average exposure integral offset $\overline{Q1}$ of the first quadrant, where $$A = \sum_{k=1}^{M} |\overline{Q1k} - \overline{Q1}|.$$

The evaluation value B for the second quadrant is calculated by summing up the absolute differences between the partition averages $\overline{Q21}$ . . . $\overline{Q2M}$ and the average exposure integral offset $\overline{Q2}$ of the second quadrant, where $$B = \sum_{k=1}^{M} |\overline{Q2k} - \overline{Q2}|.$$

The evaluation value C for the third quadrant is calculated by summing up the absolute differences between the partition averages $\overline{Q31}$ . . . $\overline{Q3M}$ and the average exposure integral offset $\overline{Q3}$ of the third quadrant, where $$C = \sum_{k=1}^{M} |\overline{Q3k} - \overline{Q3}|.$$

The evaluation value D for the fourth quadrant is calculated by summing up the absolute differences between the partition averages $\overline{Q41}$ . . . $\overline{Q4M}$ and the average exposure integral offset $\overline{Q4}$ of the fourth quadrant, where $$D = \sum_{k=1}^{M} |\overline{Q4k} - \overline{Q4}|.$$

The overall evaluation value Diff_total is the sum of the evaluation values A to D, where Diff_total=A+B+C+D.

Through node C1, the step S608 of FIG. 6B is performed, by which it is determined whether the average exposure integral offsets $\overline{Q1}$ . . . $\overline{Q4}$ of the first to the fourth quadrants are all positive or all negative. When all positive or all negative, the step S610 is performed, by which the current assumption of period length is ruled out from consideration, and the periodic length W is refreshed by another value, and the steps go back to step S604.

Referring the average exposure integral offsets $\overline{Q1}$ . . . $\overline{Q4}$ for the first to the fourth quadrants, when some are positive and some are negative, the step S612 is performed. In the step S612, it is determined whether the maximum of the average exposure integral offsets $\overline{Q1}$ . . . $\overline{Q4}$ for the first to the fourth quadrants is greater than an upper threshold value Max_Th, and whether the minimum of the average exposure integral offsets $\overline{Q1}$ . . . $\overline{Q4}$ for the first to the fourth quadrants is lower than the lower threshold value Min_Th. When any of the two conditions is not satisfied, the step S614 is performed. In the step S614, if? the current assumption of period length is ruled out from consideration, and the periodic length W is refreshed by another value, the steps go back to step S604.

In a case wherein Max($\overline{Q1}$, $\overline{Q2}$, $\overline{Q3}$, $\overline{Q4}$)>Max_Th and Min($\overline{Q1}$, $\overline{Q2}$, $\overline{Q3}$, $\overline{Q4}$)<Min_Th, the step S616 is performed to determine whether the evaluation values A, B, C and D for the first to the fourth quadrants are all lower than an upper limit value Cirterion_sec for the quadrant evaluation values and whether the overall evaluation value Diff_total is lower than an upper limit value Cirterion_total for the overall evaluation value. When any of the two conditions is not satisfied, the step S618 is performed, by which the current assumption of period length is ruled out from consideration, and the periodic length W is refreshed by another value, and the steps go back to step S604.

In a case wherein the evaluation values A, B, C and D are all lower than the upper limit value Cirterion_sec and the overall evaluation value Diff_total is lower than an upper limit value Cirterion_total, the step S620 is performed to determine whether the sensed image contains light flicker of a periodic length W and if so, to set the auto exposure control module 108 to suppress the light flicker of the periodic length W.

Figure 7:
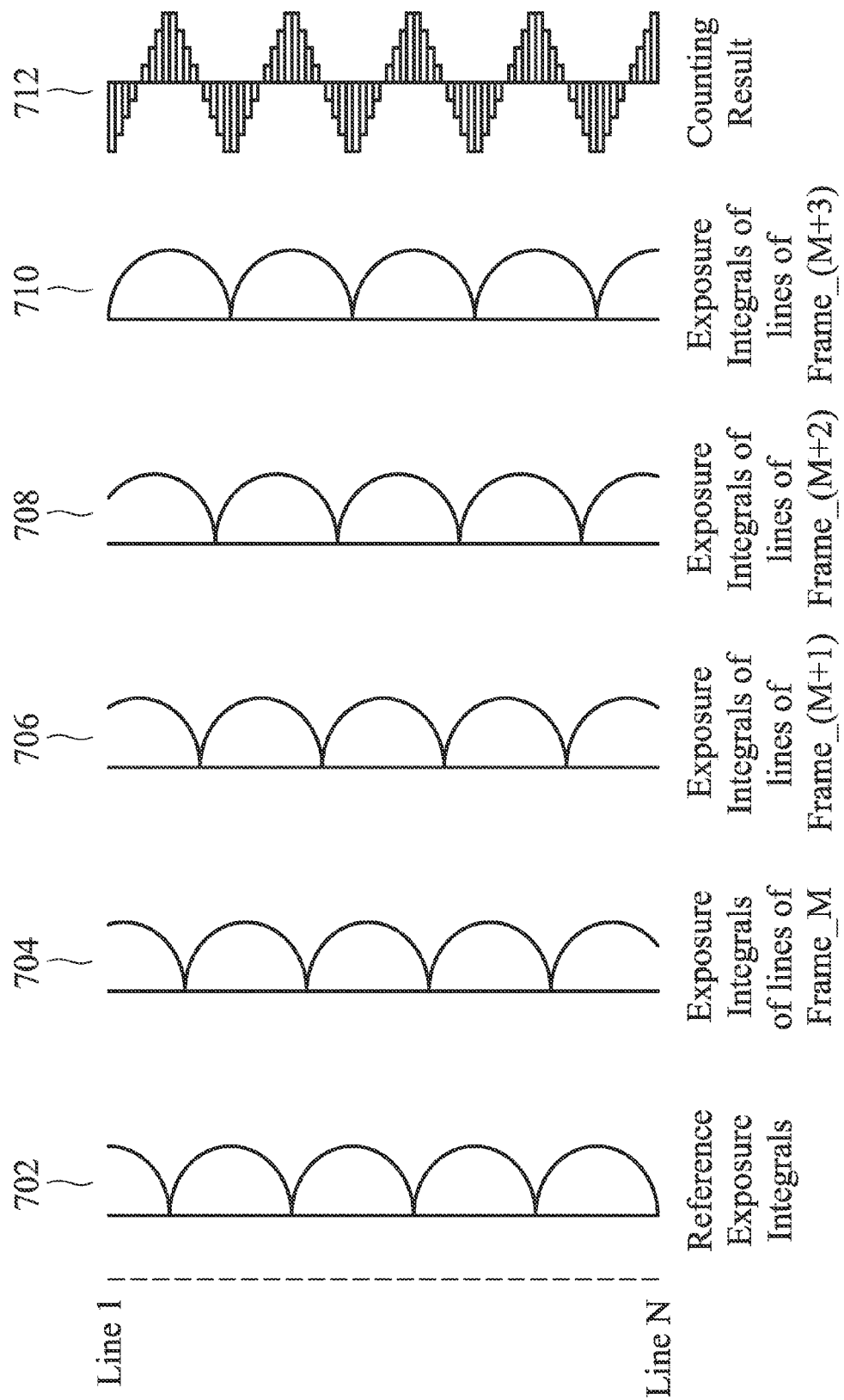
FIG. 7 illustrates the idea of statistical analysis and determination for multiple images (corresponding to the function block 220)
Figure 8A:
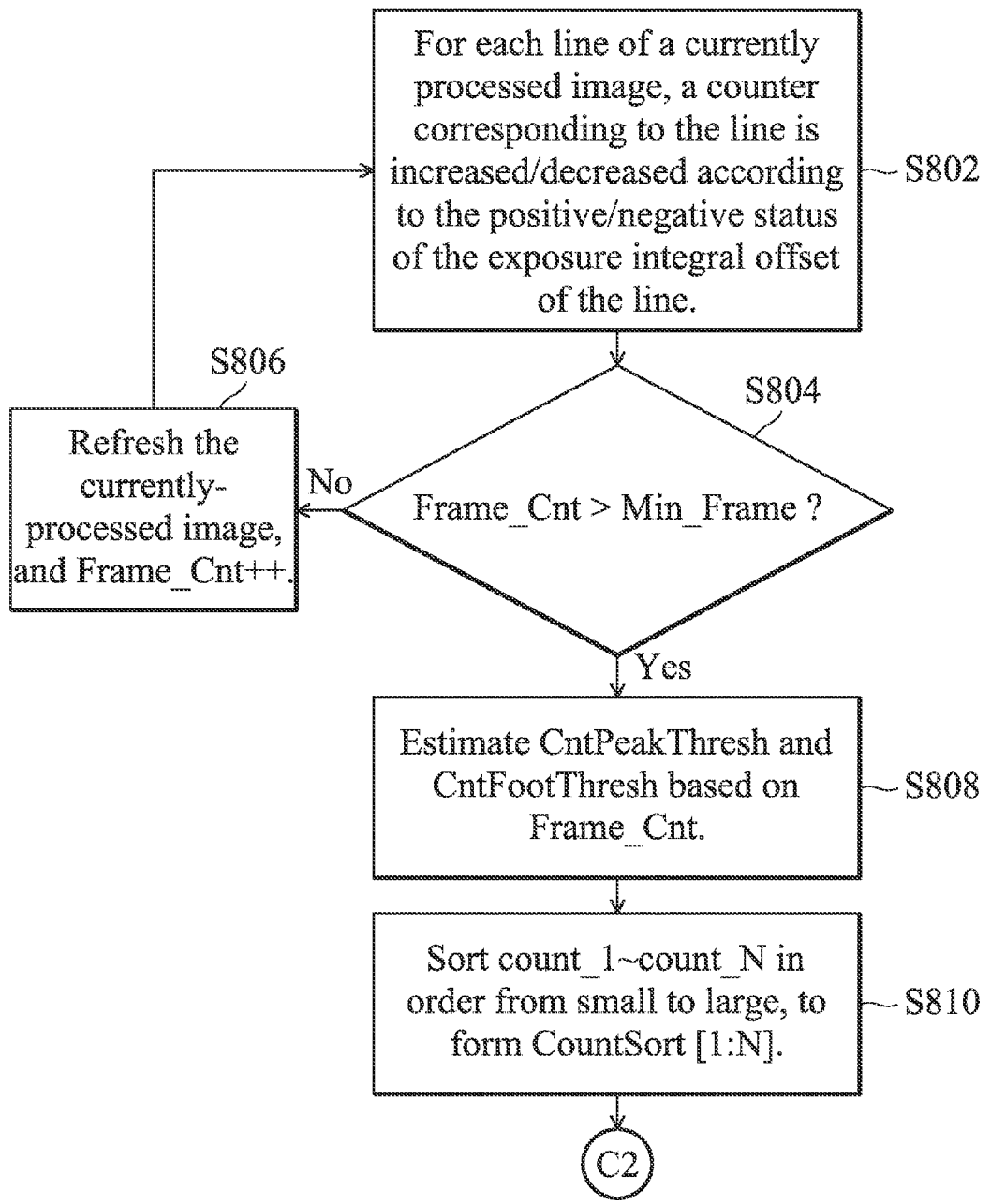
FIG. 8A and FIG. 8B show a flowchart depicting the statistical analysis and determination of the function block 220.
Figure 8B:
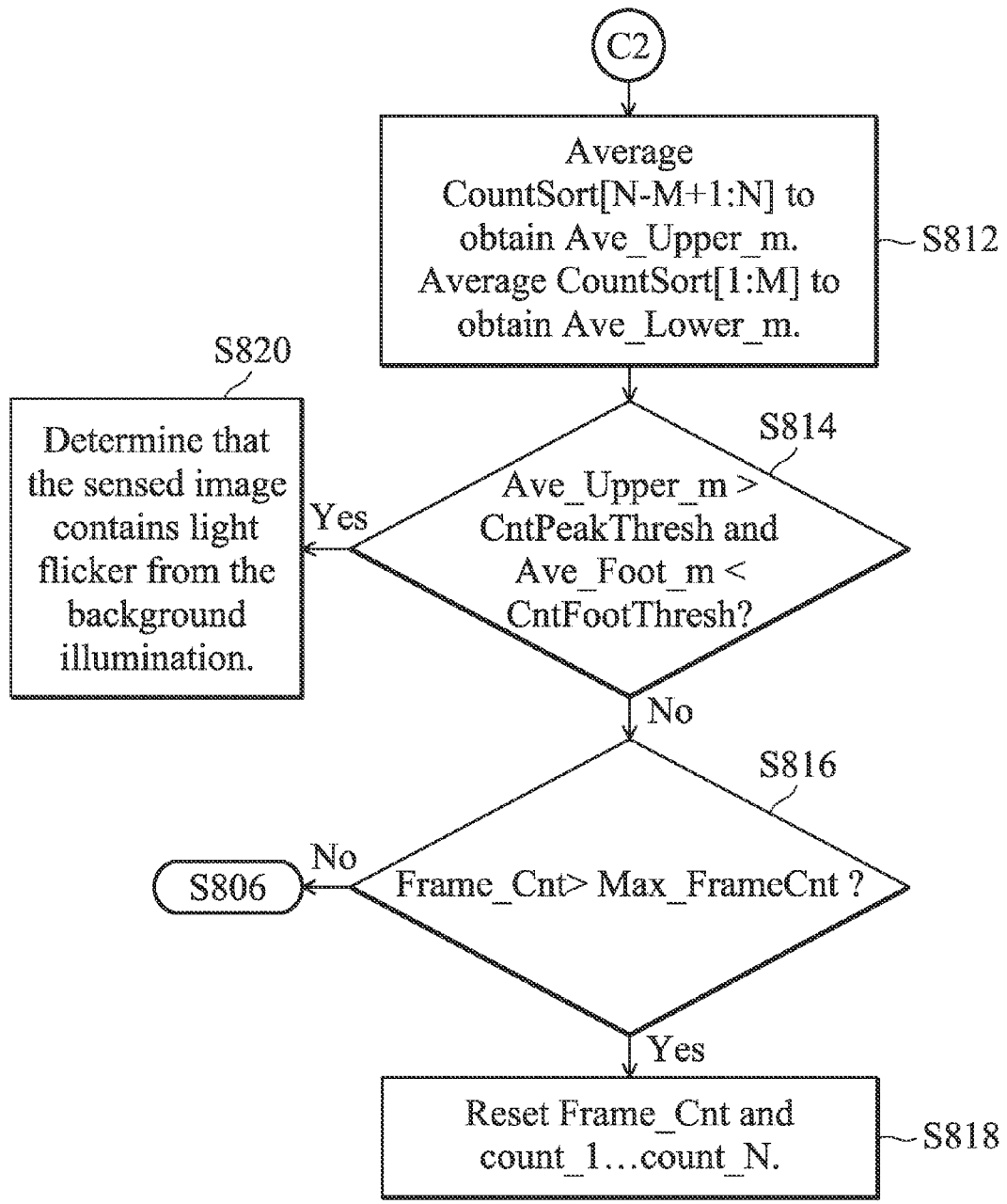

FIGS. 7, 8A and 8B illustrate the operations that the statistical analysis and determination module 208 performs on multiple images (function 220.)

FIG. 7 illustrates the idea of statistical analysis and determination for multiple images (corresponding to the function 220.) The waveform 702 depicts reference exposure integrals for different lines. The waveforms 704, 706, 708 and 710 correspond to four images Frame_M, Frame_(M+1), Frame_(M+2) and Frame_(M+3), showing the exposure integrals of the different lines. In this embodiment, N counters are required to correspond to the N lines of an image one by one. For each line, the positive and negative status of the exposure integral offsets obtained from the different images Frame_M, Frame_(M+1), Frame_(M+2) and Frame_(M+3) are recorded by the counter corresponding thereto. As shown by the counting result 712, when there are sufficient images to be taken into consideration, the counting result 712 may oscillate periodically according to the periodic flicker caused by the background illumination. In this manner, periodic light flicker can be obtained even if the exposure integral offsets of different lines just oscillate slightly.

FIGS. 8A to 8B show a flowchart depicting the statistical analysis and determination of the function 220.

In step S802, for each line of a currently processed image (referring to the exemplary embodiment of FIG. 7, the flow starts from image Frame_M, and, an image counter Frame_Cnt counting the image amount is initialized to 1,) a counter corresponding to the line is increased/decreased according to the positive/negative status of the exposure integral offset of the line. The N counters corresponding to the N different lines are labeled count_j, j=1 ... N. For one line, the positive status of the exposure integral offset increases the corresponding counter by 1, and the negative status of the exposure integral offset decreases the corresponding counter by 1.

In step S804, it is determined whether the image counter Frame_Cnt is greater than an image amount lower limit Min_Frame. When the image counter Frame_Cnt is not greater than the image amount lower limit Min_Frame, the step S806 is performed, by which the currently-processed image is refreshed by another image (e.g., the initial image Frame_M is replaced by another image Frame_(M+1), and the image amount Frame_Cnt is increased by 1,) and the step S802 is repeated.

When it is determined in step S804 that the image amount Frame_Cnt is greater than the image amount lower limit Min_Frame, the following steps S808 to S814 are performed to determined whether there is light flicker from background illumination by referring to the counting of the counters count_j, j=1 ... N.

In step S808, a peak value CntPeakThresh and a bottom value CntFootThresh are estimated based on the image amount Frame_Cnt.

In step S810, the counting results count_1 to count_j are sorted in order from small to large to form an array CountSort[1:N].

Through a terminal C2, a step S812 shown in FIG. 8B is performed, by which a peak value Ave_Upper_m and a bottom value Ave_Lower_m are estimated. The peak value Ave_Upper_m is an average value of the maximum M counting values CountSort[N−M+1:N]. The bottom value Ave_Lower_m is an average value of the minimum M counting values CountSort[1:M].

In step S814, it is determined whether the peak value Ave_Upper_m is greater than the peak threshold value CntPeakThresh, and whether the bottom value Ave_Foot_m is lower than the bottom threshold value CntFootThresh. When any of the two conditions is not satisfied, the step S816 is performed, by which it is determined whether the image count Frame_Cnt is greater than an image amount upper limit Max_CntFrame. When the image count Frame_Cnt is not greater than the image count upper limit Max_FrameCnt, the flow goes to the step S806 to refresh the currently processed image (e.g., refreshed from the image Frame_(M+1) to the image Frame_(M+2) and increasing the image counter Frame_Cnt accordingly) and then the step S806 is performed again. When the image counter Frame_Cnt is greater than the image amount upper limit Max_FrameCnt, the step S818 is performed by which the image counter Frame_Cnt is reset to 1 and the counters count_1 ... count_N are reset to zero, and the flow is closed until the reference exposure integrals stored in the storage unit 104 for the different lines are refreshed.

When it is determined in step S814 that the peak value Avg_Upper_m is greater than the peak threshold value CntPeakThresh and the bottom value Avd_Lower_m is lower than the bottom value CntFootThresh, the step S820 is performed, and it is determined that the image sensed by the image sensor 102 contains light flicker from the background illumination.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture method with an anti-flicker function, comprising estimating exposure integrals, according to an image sensed by a camera device, of a plurality of lines of the image;

comparing the exposure integrals with reference exposure integrals for the plurality of lines separately, to estimate exposure integral offsets of the plurality of lines, wherein the reference exposure integrals for the plurality of lines are obtained from at least one reference image; and statistically analyzing positive and negative changes of the exposure integral offsets over the plurality of lines and, based on the statistical analysis, determining whether the sensed image contains light flicker from background illumination, and setting an auto exposure control module of the camera device according to the determination of light flicker, wherein steps for the statistical analysis and determination comprises: dividing the plurality of lines of the image into lines corresponding to a first quadrant, lines corresponding to a second quadrant, lines corresponding to a third quadrant and lines corresponding to a fourth quadrant in accordance with a periodic length; estimating an average exposure integral offset for the first quadrant, which is an average value of the exposure integral offsets of the lines corresponding to the first quadrant; estimating an average exposure integral offset for the second quadrant, which is an average value of the exposure integral offsets of the lines corresponding to the second quadrant; estimating an average exposure integral offset for the third quadrant, which is an average value of the exposure integral offsets of the lines corresponding to the third quadrant; estimating an average exposure integral offset for the fourth quadrant, which is an average value of the exposure integral offsets of the lines corresponding to the fourth quadrant; excluding consideration for light flicker of the periodic length that is being considered when the average exposure integral offsets for the first, second, third and fourth quadrants are all positive and then refreshing the period length to re-perform the steps for statistical analysis and determination; and excluding consideration for light flicker of the periodic length that is being considered when the average exposure integral offsets of the first, second, third and fourth quadrants are all negative and then refreshing the period length to re-perform the steps for statistical analysis and determination.

2. The image capture method as claimed in claim 1, wherein the steps for the statistical analysis and determination further comprises:

excluding consideration for light flicker of the periodic length that is being considered when the maximum one of the average exposure integral offsets of the first, second, third and fourth quadrants is equal to or smaller than an upper threshold value and then refreshing the period length to re-perform the steps for statistical analysis and determination; and excluding consideration for light flicker of the periodic length that is being considered when the minimum one of the average exposure integral offsets of the first, second, third and fourth quadrants is equal to or greater than a lower threshold value and then refreshing the period length to re-perform the steps for statistical analysis and determination.

3. The image capture method as claimed in claim 2, wherein the steps for statistical analysis and determination further comprises:

averaging the exposure integral offsets for sectors of continuous lines corresponding to the first quadrant, respectively, to obtain partition averages for the first quadrant, and, summing up the absolute differences between the partition averages and the average exposure integral offset of the first quadrant to obtain an evaluation value for the first quadrant;

averaging the exposure integral offsets for sectors of continuous lines corresponding to the second quadrant, respectively, to obtain partition averages for the second quadrant, and, summing up the absolute differences between the partition averages and the average exposure integral offset of the second quadrant to obtain an evaluation value for the second quadrant;

averaging the exposure integral offsets for sectors of continuous lines corresponding to the third quadrant, respectively, to obtain partition averages for the third quadrant, and, summing up the absolute differences between the partition averages and the average exposure integral offset of the third quadrant to obtain an evaluation value for the third quadrant;

averaging the exposure integral offsets for sectors of continuous lines corresponding to the fourth quadrant, respectively, to obtain partition averages for the fourth quadrant, and, summing up the absolute differences between the partition averages and the average exposure integral offset of the fourth quadrant to obtain an evaluation value for the fourth quadrant;

summing up the evaluation values for the first, second third and fourth quadrants to obtain an overall evaluation value;

excluding consideration for light flicker of the periodic length that is being considered when the any of the evaluation values of the first, second, third and fourth quadrants is greater than an upper limit of the evaluation values and then refreshing the period length to re-perform the steps for statistical analysis and determination;

excluding consideration for light flicker of the periodic length that is being considered when the overall evaluation value is greater than an upper limit for the overall evaluation value and then refreshing the period length to re-perform the steps for statistical analysis and determination; and determining that the sensed image contains light flicker at the periodic length that is being considered when the evaluation values for the first, second, third and fourth quadrants are equal to or smaller than the upper limit for the evaluation values and the overall evaluation value is equal to or smaller than the upper limit for the overall evaluation value and then setting the auto exposure control module to suppress the light flicker at the periodic length.

4. The image capture method as claimed in claim 1, wherein the steps for statistical analysis and determination comprises:

providing a plurality of counters corresponding to the plurality of lines of one image;

initially using the sensed image as a currently-processed image;

increasing the counters corresponding to the lines having positive exposure integral offsets by 1, respectively, and, decreasing the counters corresponding to the lines having negative exposure integral offsets by 1.

5. The image capture method as claimed in claim 4, wherein the steps for statistical analysis and determination further comprises:

refreshing the currently-processed image by a subsequent image sensed by the camera device when an image amount of processed images is equal to or smaller than an image amount lower limit, to continue the counting of the counters; and determining whether there is light flicker from background illumination according to the counting of the counters when the image amount of the processed image is greater than the image amount lower limit.

6. The image capture method as claimed in claim 5, wherein the steps of making a determination based on the counting of the counters comprise:

sorting counting values of the counter;

estimating a peak value which is an average value of the maximum M of the counting values;

estimating a bottom value which is an average value of the minimum M of the counting values;

estimating a peak threshold value and a bottom threshold value based on the image amount of the processed image; and determining whether there is light flicker from background illumination when the peak value is greater than the peak threshold value and the bottom value is lower than the bottom threshold value, and thereby setting the auto exposure module to suppress the light flicker when there is light flicker from background illumination.

7. The image capture method as claimed in claim 6, further comprising:

using a subsequent image sensed by the camera device to refresh the currently processed image and continuing the counting of the counters and the determination based on the counting of the counters when the peak value is equal to or lower than the peak threshold value and the image amount of the processed image is equal to or lower than an image amount upper limit; and using the subsequent image sensed by the camera device to refresh the currently processed image and continuing the counting of the counters and the determination based on the counting of the counters when the bottom value is equal to or greater than the bottom threshold value and the image amount is equal to or lower than the image amount upper limit.

8. An anti-flicker camera, comprising:
an image sensor;
an image signal processor, coupled to the image sensor;
a flicker detector, determining whether an image sensed by the image sensor contains light flicker from background illumination in accordance with image data provided by the image signal processor; and
an auto exposure control module, controlling the image sensor to compensate for the light flicker when the light flicker is detected by the flicker detector,
wherein the flicker detector comprises:
  a line exposure integral estimation module, estimating exposure integrals for a plurality of lines of the image sensed by the image sensor, respectively;
  a storage unit, storing reference exposure integrals for the plurality of lines, wherein the reference exposure integrals are obtained from at least one reference image;
  an offset calculation module, coupled to the line exposure integral estimation module and accessing the storage unit, wherein the offset calculation module compares the exposure integrals with the reference exposure integrals for the plurality of lines separately, to estimate exposure integral offsets of the plurality of lines of the image sensed by the image sensor; and
  a statistical analysis and determination module, statistically analyzing positive and negative changes of the exposure integral offsets over the plurality of lines and, based on the statistical analysis, determining whether there is light flicker from background illumination, wherein the statistical analysis and determination comprises: dividing the plurality of lines of the image into lines corresponding to a first quadrant, lines corresponding to a second quadrant, lines corresponding to a third quadrant and lines corresponding to a fourth quadrant in accordance with a periodic length; estimating an average exposure integral offset for the first quadrant, which is an average value of the exposure integral offsets of the lines corresponding to the first quadrant; estimating an average exposure integral offset for the second quadrant, which is an average value of the exposure integral offsets of the lines corresponding to the second quadrant; estimating an average exposure integral offset for the third quadrant, which is an average value of the exposure integral offsets of the lines corresponding to the third quadrant; estimating an average exposure integral offset for the fourth quadrant, which is an average value of the exposure integral offsets of the lines corresponding to the fourth quadrant; excluding consideration for light flicker of the periodic length that is being considered when the average exposure integral offsets for the first, second, third and fourth quadrants are all positive and then refreshing the period length to re-perform the steps for statistical analysis and determination; and excluding consideration for light flicker of the periodic length that is being considered when the average exposure integral offsets of the first, second, third and fourth quadrants are all negative and then refreshing the period length to re-perform the steps for statistical analysis and determination.

9. The anti-flicker camera as claimed in claim 8, wherein the auto exposure control module further controls the image signal processor to compensate for the light flicker when the flicker detector detects the light flicker from background illumination.

10. The anti-flicker camera as claimed in claim 8, wherein, relative to a specific condition of the reference exposure integrals, the statistical analysis and determination module performs statistical analysis and determination on one single image as well as on multiple images.

* * * * *